US010457859B2

(12) United States Patent
Robl et al.

(10) Patent No.: US 10,457,859 B2
(45) Date of Patent: Oct. 29, 2019

(54) PROPPANT FOR USE IN HYDRAULIC FRACTURING TO STIMULATE A WELL

(71) Applicant: University of Kentucky Research Foundation, Lexington, KY (US)

(72) Inventors: Thomas Lee Robl, Sadieville, KY (US); Anne Elizabeth Oberlink, Lexington, KY (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 0 days.

(21) Appl. No.: 15/346,794

(22) Filed: Nov. 9, 2016

(65) Prior Publication Data

US 2017/0051199 A1    Feb. 23, 2017

Related U.S. Application Data

(62) Division of application No. 14/688,131, filed on Apr. 16, 2015, now abandoned.

(60) Provisional application No. 61/980,852, filed on Apr. 17, 2014.

(51) Int. Cl.
*C09K 8/80* (2006.01)
*C09K 8/62* (2006.01)
*E21B 43/267* (2006.01)

(52) U.S. Cl.
CPC .................. *C09K 8/80* (2013.01); *C09K 8/62* (2013.01); *E21B 43/267* (2013.01)

(58) Field of Classification Search
CPC ......... C09K 8/62; C09K 8/80; Y10S 507/924; E21B 43/267
USPC .......................................................... 507/200
See application file for complete search history.

(56) References Cited

U.S. PATENT DOCUMENTS

| | | | | |
|---|---|---|---|---|
| 5,681,384 A * | 10/1997 | Liskowitz | ............... | C04B 18/08 106/705 |
| 2003/0089642 A1* | 5/2003 | Bradley | .................... | B03B 9/04 209/11 |
| 2012/0048557 A1* | 3/2012 | Hughes | .................... | C09K 8/70 166/308.1 |
| 2013/0161003 A1* | 6/2013 | Makarychev-Mikhailov | .............. | C09K 8/685 166/280.1 |
| 2013/0317274 A1* | 11/2013 | Fan | .......................... | A62D 3/36 588/318 |

* cited by examiner

*Primary Examiner* — Aiqun Li
(74) *Attorney, Agent, or Firm* — King & Schickli, PLLC

(57) ABSTRACT

A proppant for use in hydraulic fracturing to stimulate a well is provided. The proppant is fly ash particles having a mean particle size (d50) of between 45 μm and 150 μm and a size distribution defined by (d10)≤5 μm and (d98)≤250 μm.

13 Claims, 7 Drawing Sheets

US 10,457,859 B2

PROPPANT FOR USE IN HYDRAULIC FRACTURING TO STIMULATE A WELL

RELATED APPLICATIONS

This application is a Divisional application of U.S. patent application Ser. No. 14/688,131, published as U.S. Patent Publication No. 2015/0299560, which was filed on Apr. 16, 2015, and which claims priority to U.S. Provisional Patent Application Ser. No. 61/980,852 filed on 17 Apr. 2014, the disclosures of which are hereby incorporated by reference in their entirety.

GOVERNMENT INTEREST

This invention was made in part with Government support from grants NSF SBIR Phase I, IIP-0740339 and Phase II, IIP-0923822 awarded by National Science Foundation. The Government may have certain rights in the invention.

TECHNICAL FIELD

This document relates generally to the oil and gas well field and more particularly to a proppant for use in hydraulic fracturing to stimulate a well.

BACKGROUND

Oil and gas production via fracking require the drilling of long horizontal wells, the fracturing of shale or siltstone, by various methods, and finally the treatment of the well to stabilize the fractures. This final step is typically accomplished by pumping a slurry of natural or manufactured sand product into the fractured zone to prop them open. Hence the term "proppant". The packed bed must maintain a high degree of hydraulic conductivity as it must readily pass oil, gas and water.

A tradeoff exists for the smaller size range of proppants which are capable of stabilizing smaller fractures that generate a lot of the oil and gas, an advantage, but typically result in a lowered permeable pack, a drawback. The development of proppants that are small enough to prevent the healing of micro fractures (i.e. "micro-proppants"), but still demonstrate critical hydraulic conductivity as well as strength, represents both formidable challenge and a great opportunity.

This document describes a small diameter proppant, having high hydraulic conductivity and strength, from the hydraulic and mechanical classification of ponded Class F fly ash.

SUMMARY

In accordance with the purposes and benefits described herein, a proppant is provided for use in hydraulic fracturing to stimulate a well. The proppant may be broadly described as comprising fly ash particles having a mean particle size (d50) of between 45 pm and 150 pm and a size distribution defined by (d10)=5 um and a (d98) 250 µm. In one possible embodiment, the fly ash particles have a particle roundness and sphericity of greater than 0.8 as determined by ISO 13503-2006 (E), part 7.

In one possible embodiment, the fly ash particles have a hydraulic conductivity of $1 \times 10^{-3}$ cm/sec or less as determined by the falling head method. In one possible embodiment, the fly ash particles have an absolute density of less than 2.4 g/cm$^3$ as determined by part 10.5 of ISO 13503-2006 (E).

In one possible embodiment, the fly ash particles have a bulk density of less than 1.1 g/cm$^3$ as determined by part 10.3 ISO 13503-2006 (E). In one possible embodiment, the fly ash particles have a void volume of greater than 45% as calculated from absolute volume (AV) and bulk specific volume (BV) as derived from the inverse of bulk density and absolute density. In one possible embodiment, the fly ash particles have a loss on ignition of less than 6% as determined by part 12 of ISO 13503-2006 (E).

In accordance with an additional aspect, a proppant is provided for use in hydraulic fracturing to stimulate a well wherein that proppant comprises fly ash particles having a mean particle size (d50) of between 80 µm and 100 µm and a size distribution defined by (d5)≤5 µm and (d99.5)≤250 µm. In one possible embodiment, the fly ash particles further have a particle roundness and sphericity of greater than 0.9 as determined by ISO 13503-2006 (E), part 7.

In one possible embodiment, the fly ash particles have a hydraulic conductivity of $1.5 \times 10^{-2}$ cm/sec or less as determined by the falling head method. In one possible embodiment, the fly ash particles have an absolute density of less than 2.3 g/cm$^3$ as determined by part 10.5 of ISO 13503-2006 (E).

In one possible embodiment, the fly ash particles have a bulk density of less than 1.0 g/cm$^3$ as determined by part ISO 13503-2006 (E). In one possible embodiment, the fly ash particles have a void volume of greater than 50% as calculated from absolute volume (AV) and bulk specific volume (BV) as derived from the inverse of bulk density and absolute density. In one possible embodiment, the fly ash particles have a loss on ignition of less than 2% as determined by part 12 of ISO 13503-2006 (E).

In accordance with an additional aspect, a method is provided for hydraulic fracturing of a subterranean formation having a well bore. That method includes injecting into the well bore a slurry containing a first proppant at sufficiently high rates and pressures to fracture the subterranean formation so as to accept the slurry. That proppant is described in this document.

Further the method may include injecting a second proppant into the well bore with the first proppant where the second proppant has a larger mean particle size than the first proppant.

In yet another embodiment, the method includes injecting a second proppant into the well bore after the first proppant where the second proppant has a larger mean particle size than the first proppant.

In the following description, there are shown and described several preferred embodiments of the proppant and the related method of use. As it should be realized, the proppant and method of use are capable of other, different embodiments and their several details are capable of modification in various, obvious aspects all without departing from the proppant and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the proppant and related method and together with the description serve to explain certain principles thereof. In the drawing figures:

FIG. 1 includes two scanning electron micrographs comparing the relatively spherical surface of the fly ash proppant described in this document to clay minerals.

Figure 1:
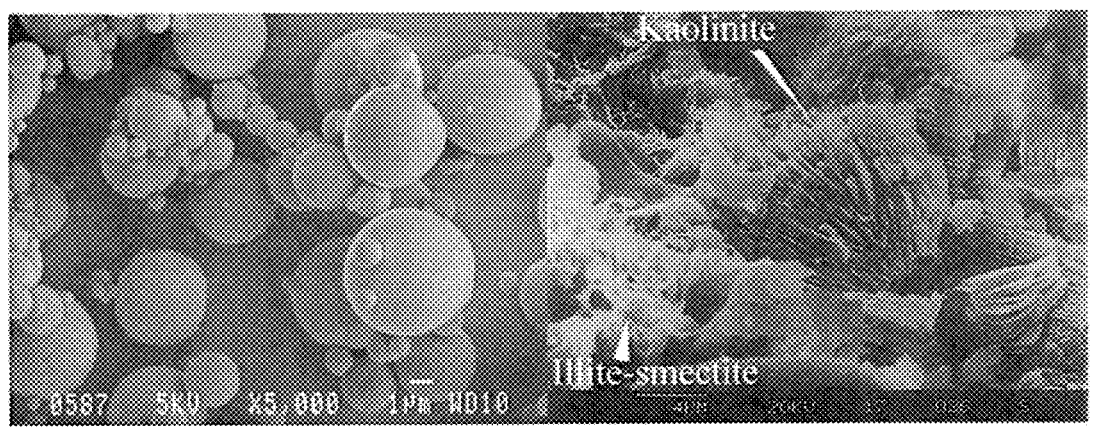

Reference will now be made in detail to the present preferred embodiments of the proppant, examples of which are illustrated in the accompanying drawing figures.

DETAILED DESCRIPTION

A proppant for use in hydraulic fracturing to stimulate a well comprises fly ash particles having a mean particle size (d50) of between 45 pm and 150 pm and a size distribution defined by (d10)=5 μm and a (d98)≤250 μm. The fly ash particles have a particle roundness and sphericity of greater than 0.8 as determined by ISO 13503-2006 (E), part 7.

The fly ash particles have a hydraulic conductivity of $1 \times 10^{-3}$ cm/sec or less as determined by the falling head method. Further, the fly ash particles have an absolute density of less than 2.4 g/cm$^3$ as determined by part 10.5 of ISO 13503-2006 (E).

In addition, the fly ash particles have a bulk density of less than 1.1 g/cm$^3$ as determined by part 10.3 of ISO 13503-2006 (E). Further, the fly ash particles have a void volume of greater than 45% as calculated from absolute volume (AV) and bulk specific volume (BV) as derived from the inverse of bulk density and absolute density, or VV=(BV−AV)/BV×100. Still further, the fly ash particles have a loss on ignition of less than 6% as determined by part 12 of ISO 13503-2006 (E).

In accordance with an additional embodiment, the proppant comprises fly ash particles having a mean particle size (d50) of between 80 μm and 100 μm and a size distribution defined by a (d99.5)≤250 μm. Further, the fly ash particles have a particle roundness and sphericity of greater than 0.9 as determined by ISO 3503-2006 (E), part 7. Still further, the fly ash particles have a hydraulic conductivity of $1.5 \times 10^{-2}$ cm/sec or less as determined by the falling head method.

In addition, the fly ash particles have an absolute density of less than 2.3 g/cm$^3$ as determined by part 10.5 ISO 13503-2006 (E). In addition, the fly ash particles have a bulk density of less than 1.0 g/cm$^3$ as determined by part 10.3 of ISO 13503-2006 (E).

The fly ash particles also have a void volume of greater than 50% as calculated from absolute volume (AV) and bulk specific volume (BV) as derived from the inverse of bulk density and absolute density, or VV=(BV−AV)/BV×100. Still further, the fly ash particles have a loss on ignition of less than 2% as determined by part 12 of ISO 13503-2006.

This document also relates to a method of hydraulic fracturing a subterranean formation having a well bore. That method may be broadly described as injecting into the well bore a slurry containing a first proppant at sufficiently high rates and pressures to fracture the subterranean formation to accept the slurry where that first proppant comprises fly ash particles as set forth and described in this document. In one possible embodiment, the method further includes injecting a second proppant into the well bore with the first proppant where the second proppant has a larger mean particle size than the first proppant. That second proppant may comprise sand or other proppants known in the art.

In yet another embodiment, the method includes injecting the second proppant into the well bore after the first proppant.

The following further describes the proppant and the technology. It is critical that the emplaced proppants not only keep micro fractures from healing but also allow good flow of oil or gas through it. The flow through a packed bed is described by the well-known Carman-Kozeny equation which states:

$$\frac{Q}{A} = \frac{\Delta p}{\mu L} \frac{\epsilon^3}{5(1-\epsilon)^2 S^2}$$

where Q is the volumetric flow rate, A is the face area of the bed, L is the depth of the bed, Δp is the applied pressure drop, € is the void volume of the bed and S is the volume specific surface of the bed. Note that particle diameter is not described in the equation. What Carman-Kozeny teaches is the importance of void volume and surface area to flow through a packed media.

Void Volume, €.

The void volume or porosity of any packed sand is not a function of particle size but rather particle size distribution, shape and packing. The porosity of a bed of large ball bearings is the same as the porosity of a bed of BB's if each particle has the same diameter, the same surface smoothness and identical packing. The greatest packing density achievable for spherical particles of the same diameter is for hexagonal close packing which results in a density $$D = \pi\sqrt[2]{18} = 0.74$$

or about 26% void volume. However this is almost never achieved due to physical constrains that the particles place on one another (they lock or jam each other) and most systems are best described by cubic close packing, which achieves a packing density D=π/6=0.52 or about 48% void volume (in practice ~45% void volume is typical). Thus the more uniform the particles are the more void volume is present, the higher the potential flow.

The roundness or spheriodicity of the particle is an important factor in void volume. The discussion above only relates to particle that are round or very nearly so. The American Petroleum Institute (API) and ISO standards[2,3,4,5] specifies a spheriodicity of 0.7 or greater (shortest cord length of a particle divided by the longest) for proppants. It is clear from the SEM of FIG. 1 that fly ash has an almost perfect roundness with a spheriodicity that approaches ~1.0 for many of the particles.

Surface Area, S.

Where particle size does enter the equation is in the surface area component of the equation, S2. This is critical in providing resistance to flow or drag. The more internal surface the more resistance to flow. The specific surface area of a packed bed is a function of two parameters, particle size and particle surface roughness. Surface roughness can be very critical. The smoother the surface the better the flow. This is illustrated in FIG. 1 which compares at similar resolution SEM's of a classified Class F fly ash (the fine fraction in this case) with that of kaolinite and illite. The latter are two common clay minerals that are important components of most shale. The difference in the surfaces of these materials is obvious.

The effect of particle sizes on surface area is also important. For example the finest proppant size recognized by the API is 70×140 mesh or 210×140 µm. below this size range the particles are considered too small to be useful as a proppant.

Figure 2:
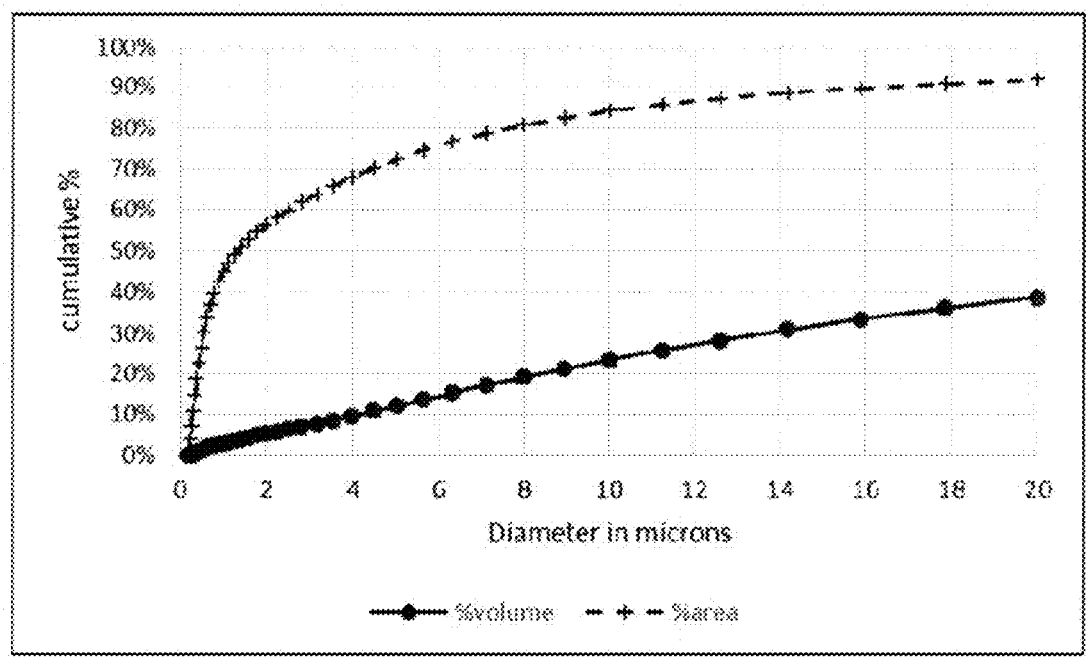
FIG. 2 is a plot of cumulative percent surface area and volume percent as a function of particle diameter for unclassified fly ash.

The effect of particle size on surface area for unclassified fly ash is illustrated in FIG. 2. This is a plot of the cumulative volume and area, as percent, as a function of particle diameter (as measured by laser). It is found that the particles that are smaller than 10 µm represent 30% of the volume of the ash but well over 90% of the total surface area.

An Effective Micro Proppant from Fly Ash.

Coal combustion fly ash has many positive characteristics for use as a proppant. It is almost perfectly round and has a very smooth surface. It has, however, a very broad particle size range which results in low hydraulic conductivity. FIG. 2 illustrates the need to produce a proppant with a paucity of particles less than 10 µm in diameter. Also the discussion on void volume clearly illustrates the need to produce a material with a very narrow size distribution.

The critical steps in the production of a useful micro-proppant from fly ash is the elimination of the smallest particles, narrowing of the size distribution and increasing the overall average particle size of the ash.

Hydraulic Conductivity of Proppants.

Class F fly ash, as defined by the ASTM C618 standard, were used in this test work. Three different sources of ash were used, two from Kentucky and one from Ohio. The samples included ash collected dry and from ponds. The composition of these fly ash are typically and generally representative of Class F ash as defined by the ASTM Standard. The falling head method was used to measure the hydraulic conductivity of fly ash and ash derived proppants. This approach is considered more appropriate for fine grain specimens than the constant head method and provides good reproducible and comparable data. The method defines hydraulic conductivity, K, in units of time/length and is normally standardized to 20° C. ($K_{20}$). Values less that $10^{-6}$ cm/sec (0.036 cm/hr) are considered to be impermeable. Typical values for unprocessed Class F fly ash are in the range of $10^{-5}$ to $10^{-6}$ cm/sec. The two raw ash samples tested produced permeabilities in this range.

A hydraulically classified ash recovered from a pond in Kentucky was tested along with ash from a pond in Ohio which was double screened which we will refer to as micro-proppant 1 (MP-1) and a double screened sample of ash from a power plant in northern Kentucky (MP-2). A summary of the size data is presented in Table 1. Although only somewhat coarser than the raw ash, with a d50 (which is the particle diameter at which half of the particles are smaller than on a volume basis) of 35 microns (µm) versus ~23 µm, the improvement in hydraulic conductivity is large with a measured K20 of $7.8×10^{-4}$ cm/sec or almost an order of magnitude better than the raw material ($8.5×10^{-5}$ cm/sec).

Figure 3:
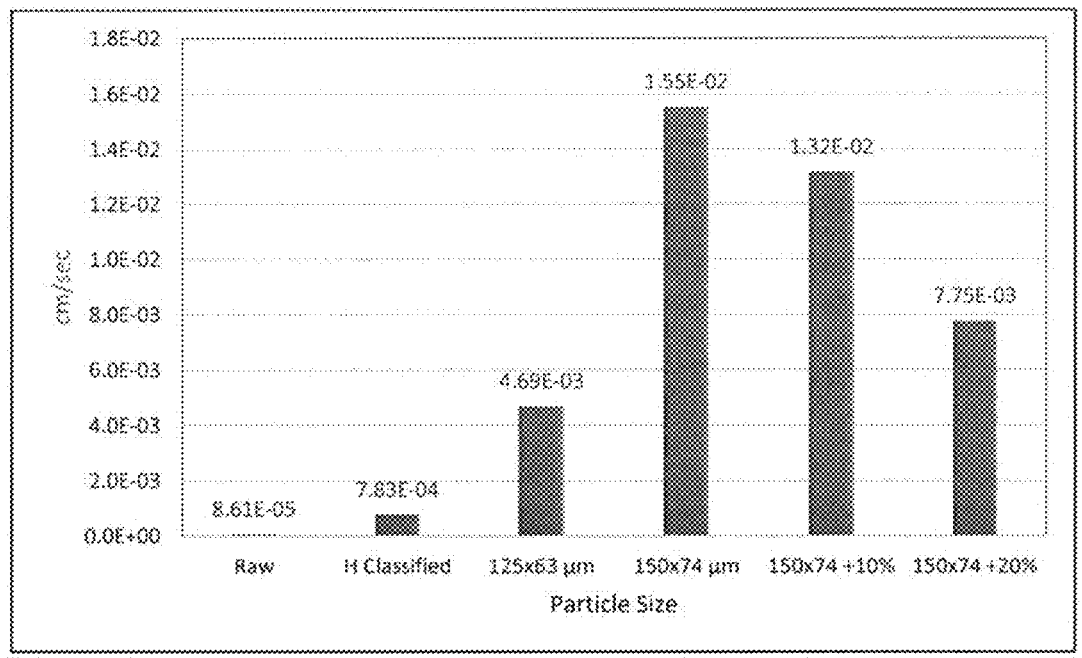
FIG. 3 is a comparison of micro proppant with raw ponded fly ash and hydraulically classified ash.

The two hydraulically classified and double screened ash had the highest hydraulic conductivity with the samples screened at 100×200 mesh (150×74 µm) having a value of $1.5×10^{-2}$ cm/sec (~1 cm/min). This hydraulic conductivity is typical of that found for fine to medium size sand, well within the range of proppants described in the API series.[2,3] The effect of fines on the overall hydraulic conductivity was examined by adding back the minus −200 mesh into 100× 200 mesh material. This data is plotted in FIG. 3 as +10% and +20%. The conductivity dropped by a factor of about 2 over this range.

TABLE 1 comparison of size distribution and hydraulic conductivity for raw materials and proppant

| Source | d10 | d50 | d90 | HC cm/sec |
|---|---|---|---|---|
| Raw Fly Ash, Ky | 2.2 | 24 | 70 | $8.6 × 10^{-5}$ |
| Raw Fly Ash, Ky | 3.5 | 23 | 65 | $8.5 × 10^{-5}$ |
| Hydraulically Classified, No. 1 Ky | 12 | 35 | 60 | $7.8 × 10^{-4}$ |
| Screened 63 × 125 µm, Ohio | 18 | 73 | 115 | $4.7 × 10^{-2}$ |
| Ohio MP-1 + 20% Fines | 8 | 80 | 133 | $7.7 × 10^{-3}$ |
| Screened 74 × 150 µm, Ohio MP-1 | 9 | 86 | 136 | $1.5 × 10^{-2}$ |
| Screened 74 × 150 µm, Ky MP-2 | 11 | 83 | 136 | — |
| MP-2 5000 psi | 8 | 59 | 110 | — |
| MP-2 13,000 psi | 6 | 46 | 100 | — |

The reason for the high hydraulic conductivity of the proppant is readily apparent from the particle size distributions (Table 1). The micro proppant is found to have a much higher d50 and d90 compared to that of the raw and hydraulically classified materials, i.e. lower surface area/volume.

Void Volume of Ash Derived Proppants.

The void volume of the proppants can be calculated by their particle density, and packing volume. The latter is determined by test procedure 10.3 Bulk Density of ISO 13503-2:20065 which measures to volume and weight of powders that fill a standard cylinder from a standard funnel at a defined distance. The absolute density of the particle was measured by gas pycnometer (test procedure 10.5 Absolute Density of ISO 13503-2:2006).

TABLE 2

Comparison of void volumes of proppants

|  | NWQ | MP-1 | MP-2 |  |
|---|---|---|---|---|
| Particle Density | 2.63 | 1.98 | 2.16 | g/cm³ |
| Particle Volume | 0.38 | 0.51 | 0.46 | cm³/g |
| Bulk Density | 1.63 | 0.76 | 0.95 | g/cm³ |
| Bulk Volume | 0.61 | 1.32 | 1.05 | cm³/g |
| % Void Volume | 38% | 62% | 56% |  |

The bulk, absolute (or particle) and calculated void volume are presented for the two 74×150 µm micro-proppants, and 20×40 mesh Northern White Quartz (NWQ) in Table 2. The NWQ is a highly rounded almost pure quartz sand mined in Wisconsin and is one of the mainstays of the fracking industry. The difference in particle density is significant with the ash derived micro-proppant, being less dense by as much as 25%. A more remarkable difference is in the packing or bulk density. The NWQ sample had a measured bulk density of 1.63 g/cm³ which is close to the typical value of approximately 1.60 g/cm³ as cited in the ISO standard. The ash derived micro-proppants had bulk densities of 0.76 g/cm³ (MP-1) and 0.95 g/cm³ much less than half that of the quartz sand.

These differences in density are significant. For example the Stokes law settling velocity of the NWQ is about 47 cm/s, while that of the micro-proppant is ~0.3 to 0.4 cm/sec or two orders of magnitude lower, which means that the ash derived micro-proppants are more stable in a slurry form and will be easier to pump and emplace without the need for coatings to enhance buoyancy or fluid viscosity modifiers often needed for the gravel pack.

Crush Resistance and Void Volume Under Pressure.

Figure 4:
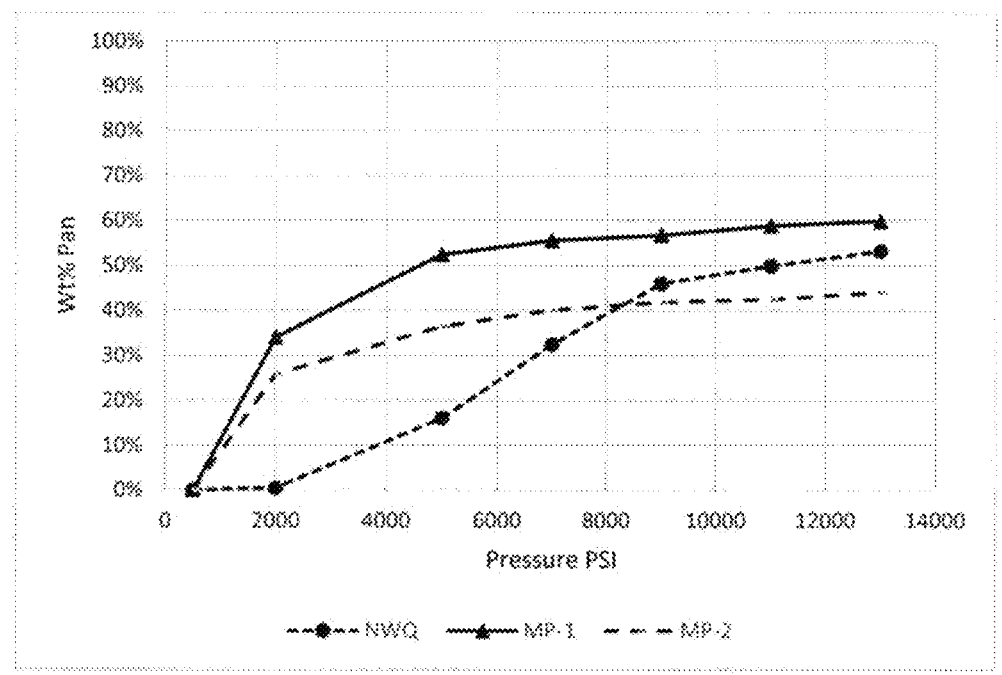
FIG. 4 is a comparison of particle fracture versus pressure for Northern White Quartz NWQ and micro proppants.

After fracking and emplacement the proppants are subjected to high pressures. An important parameter is the breakdown of the particles with pressure as defined by the 11.5 Crush-resistance procedure, of ISO 13503-2:2006). Data comparing the 20×40 mesh NWQ and the 100×200 mesh micro-proppants are presented in Table 3 and FIG. 4. Also in the table is the change in void volume as a function of pressure of the sample in the pressure cell (See also FIG. 5).

TABLE 3

Comparison of fracture and void volume for proppants

| psi | NWQ | MP-1 | MP-2 | NWQ | MP-1 | MP-2 |
|---|---|---|---|---|---|---|
| | Wt % Pan | | | Void Volume % | | |
| 500 | 0% | 0% | 0% | 39% | 60% | 56% |
| 2000 | 0% | 34% | 26% | 36% | 44% | 42% |
| 5000 | 16% | 52% | 36% | 34% | 34% | 36% |
| 7000 | 33% | 56% | 40% | 32% | 31% | 33% |
| 9000 | 46% | 57% | 42% | 29% | 28% | 31% |
| 11000 | 50% | 59% | 42% | 26% | 26% | 30% |
| 13000 | 53% | 60% | 44% | 24% | 24% | 28% |

The data is presented as weight percent of particles that pass through the smallest appropriate sieve, 40 mesh for the quarts and 200 mesh for the micro-proppant, after being subjected to the indicated pressure. These particles are referred to as the "pan" fraction. The micro-proppants are found to produce a higher proportion of fractured particles at lower pressures than the quartz. However in the high pressure ranges from 5000 psi and above, the quartz degrades at a much higher rate increasing by 37% from 5000 to 13,000 psi (~35 to ~90 MPa) while the micro-proppants increase by about 8% over this range. At pressures above 9000 psi the MP-2 micro-proppant shows less degradation than the quartz. Thus after an initial period of rapid fracturing for the proppant the material becomes stiff and strong. The changes in size distribution is presented in Table 1 for the MP-2 proppant. At 5000 psi (34.5 MPa) the material still has a size distribution similar to that of the unstressed material with a d50 and d90 still twice that of the raw ash. Even at 13000 psi (90 MPa) the micro-proppant maintains a d50 well above that of the raw ash and should maintain a serviceable hydraulic conductivity even at extreme pressure.

Figure 5:
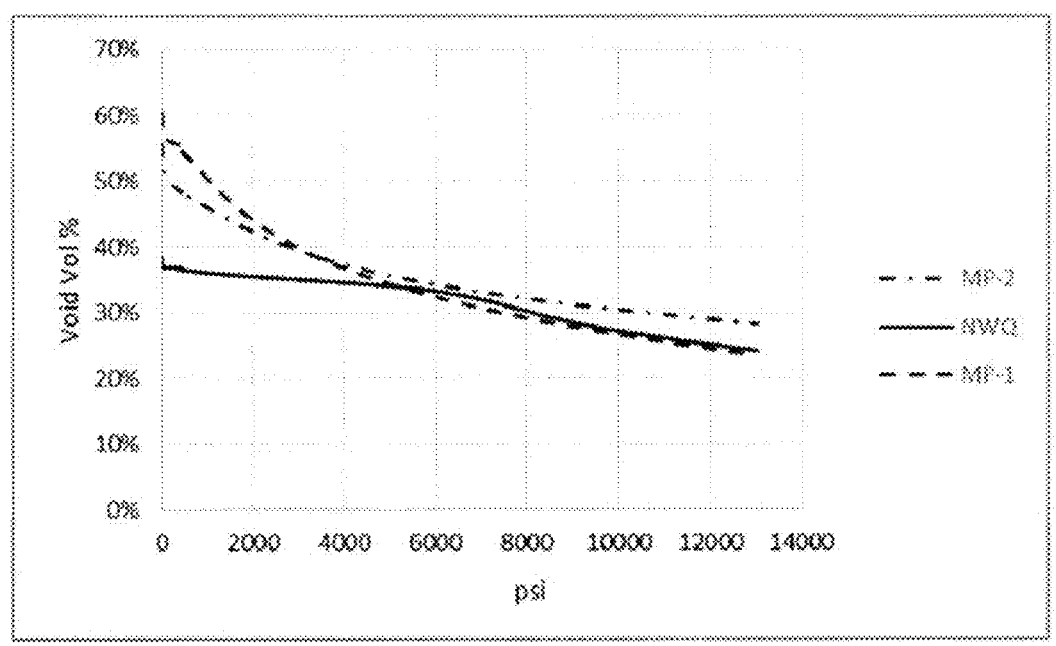
FIG. 5 is a comparison of changes in void volume as a function of pressure for proppants.

The relative changes in void volume for the proppants is plotted in FIG. 5. The micro-propants have essentially the same void volume over the critical range of 4,000 to 8,000 psi as the quartz. At higher pressures the MP-2 micro-proppant actually maintains higher void volume than the NWQ. This is significant as even though the initial deformation of the micro-proppant is higher it still maintains significant void volume.

The behavior of the ash derived proppant is best explained by the differences found in its absolute or particle density. The particle density for the smaller sized fractions of this ash is found to be higher than that of courser fractions. For example, for MP-1, the determined density of the less than 200 mesh (<74 μm) fraction was 2.51 g/cm$^3$, while that of the 100×200 mesh micro-proppant was determined to be 1.97 g/cm$^3$. This difference is due to the inclusion of bubbles in the glass themselves from gases trapped during formation as there are no significant differences in chemical composition. Assuming the smaller fractions have near zero internal air voids, the 100×200 mesh proppant is calculated to have 21.5% internal voids. Similarly, the MP-2 microproppant had a density of 2.16 g/cm$^3$ and fine material was 2.6 g/cm$^3$. A bubble content of 17% is estimated. The lower void content may explain why this material appears to be somewhat stronger than MP-1. These bubbles give the proppant buoyancy and increase the flowability of slurries. They also represent particles that are easily fractured early. However the glass itself appears to be very strong and is capable of supporting and holding open fracture that are very small in nature.

The Utilization of Fly Ash Derived Micro-Proppant.

Although in the discussion above it is compared to Northern White Quartz and it may be feasible to use the micro-proppant on its own, it is envisioned to be used in combination with other coarser proppants including both natural and synthetic proppants. The described ash derived proppant consists of a material that has a considerably smaller size than the lower range of the API series (i.e. 120×230 mesh versus 70×140 mesh), but possess the hydraulic conductivity of the coarser material. This product will be useful in the fracking industry to help improve the packing of oil and gas wells by propping open micro fractures that are too small for larger proppants. Preventing these micro fractures from closing will help to extend the life and yield of the treated oil and gas wells (FIG. 5).

Figure 6:
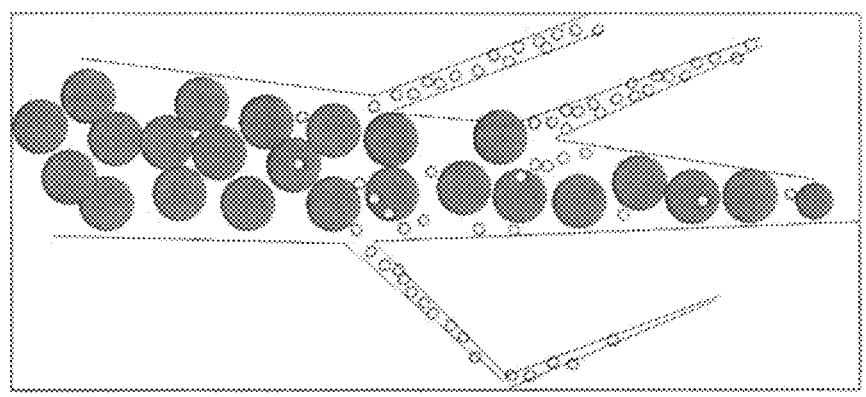
FIG. 6 illustrates how micro proppants are used in combination with a coarse gravel pack.

Although the proposed micro-proppant will have applications as a standalone product, it is also envisioned that it may also be used with a sand or gravel sized proppant package. In this application the micro-proppant would be used in a packing strategy to prop micro fractures, followed by more conventional coarse sand sized material (FIG. 6).

The Production of a Micro-Proppant From Coal Combustion Fly Ash.

The creation of this product requires a Class F fly ash that has a significant fraction of particles in the range of 45 to 150 μm range and that are amenable to classification either by hydraulic or pneumatic methods. The production of a proppant by dry methods would include multiple operations or passes of materials thorough air classifiers to remove the finest fractions and produce a concentrate. If required the material may then be passed through a double screening deck to produce a material with narrowed particle size range.

Another very practical approach is the production of a micro-proppant from wet ponded fly ash using a hydraulic classifier or hydro-cyclone in conjunction with a double wet screening process. This approach is capable of operating on highly heterogeneous ash and produce classified materials with very narrow size distributions.

Figure 7:
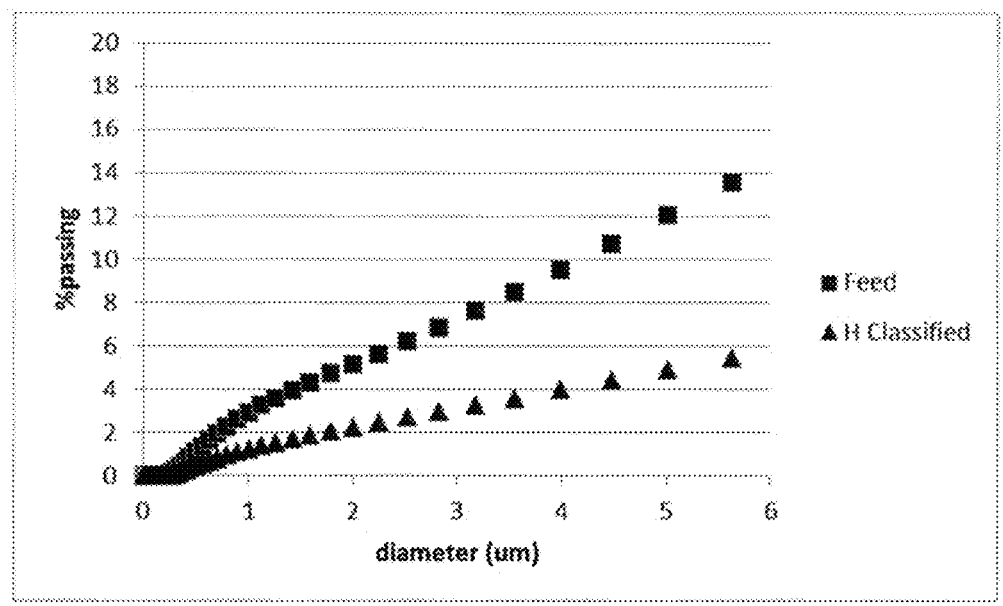
FIG. 7 is a plot of volume percent less than 5 micron for raw ash and hydraulically classified ash.

A two-step approach was used to produce an ash based proppant used in this discussion. First the ash is hydraulically classified to remove most of the fine materials, thus reducing the surface area of the proppant and increasing the yield of the material in the appropriate size range. An example of a material prepared with a cross current lamellae hydraulic classifier[1] is shown in FIG. 7. The difference between the hydraulically classified ash and raw ash for this case is clearly reflected in the d10, the diameter where the cumulative volume reaches 10%, which is 12.0 μm for the classified ash, and 2.1 to 3.1 μm for unclassified ash (Table 1). This is also illustrated in FIG. 7 which is a cumulative plot of the particles below 5 μm, for raw ponded ash and hydraulically classified ash.

The yield of the micro-proppant is also increased by hydraulic classification. In an example from the ponded ash located in Ohio, the 100×200 mesh fraction was increased from an average of 9% by weight to ~25% in a single pass using a hydraulic classification. It is noted here that the pre-concentration of the ash is not essential to the production of the micro-proppant but pre-concentration results in greater efficiencies in subsequent processes such as double screening and or spiral classification and separation, increasing yield and reducing cost.

Ash has been processed from several sources including ash ponds at the Kentucky Utilities (KU) Ghent power plant, LG&E's Trimble County power plant, both located in Kentucky, TVA's Kingston power plant in Tennessee and AEP's Cardinal power plant in Ohio. All of these materials are Class F fly ash and behave similarly, but not identically, in classification tests. The most extensive testing as a proppant has been conducted on the ash from the Cardinal power plant.

Advantages of Ash Derived Micro-Proppant: within the range of this specification, this proppant has many advantages:

Almost Perfect Spherical Shape. The morphology of the material is derived from a suspended molten state producing perfectly round balls. The shape of these particles facilitates stabile flow with creating slurries that are pumpable long distances without settlement or phase separation issues.

High Hydraulic Conductivity. Testing to date indicates that hydraulic conductivities of the ash derived proppant in the vicinity of $10^{-2}$ cm/s are achievable, well above the hydraulic conductivity of the parent material of $10^{-5}$ to $10^{-6}$ cm/s. Thus a small silt size particle based proppant (e.g. 70-90 µm d50) demonstrated the hydraulic conductivity of a much coarser sand sized material.

Relatively Low Density. Ash derived proppant particle densities are in the range of 1.97 to 2.2 g/cm$^3$. The small size and low density result in low settling velocities, e.g. 0.3-0.4 cm/s compared to 47 cm/s for 20×40 mesh quartz sand for example. This will allow the use of lower viscosity fluids for transport with improved efficiency of placement and cleaner post fracking conditions.

High Strength. The ash derived proppant is composed of a strong ceramic glass, many of which have a naturally high mullite content, which is the mineral that gives synthetic proppants much of their strength. These materials show exceptional strength and stiffness at pressures in the 5,000 to 13,000 psi range.

Very Low Surface Area. The micro-proppant has surface area that are approximately 25% or less than that of the parent material. The low surface area results in greatly improved flow in a packed bed.

Simply Modified Surfaces. The micro proppant has a glassy surface that readily accepts low cost, environmentally friendly dispersants such as poly carboxylate, and sulfonates. The proppant also accepts silanes which can be used to enhance its hydrophobicity further increasing hydraulic conductivity.

Chemically Inert. The Class F fly ash which the micro proppant is derived from is essentially inert in a very broad pH range (~2 to ~12).

Environmentally Green Material. The micro proppant is derived from ponded and landfilled Class F ash. There is somewhere between 500 million and 1 billion tons of ash located in these storage facilities in the Eastern United States. This material represents the recycling of what is currently a waste material. These materials have been recovered from wet ponds and have been subjected to extensive washings removing any readily soluble metals or salts.

REFERENCES

1. Robl, T. L. and J. G. Groppo, 2011, Method for Hydraulically Separating Carbon and Classifying Coal Combustion Ash, U.S. Pat. No. 7,963,398.
2. API, RP 56 Recommended practices for testing sand used in hydraulic fracturing operations.
3. API RP 60 Recommended Practices for Testing High-Strength Proppants Used in Hydraulic Fracturing Operations.
4. ANSI/API, 2008, Recommended Practice 19c (supersedes API 56 and 60), Measurement of properties of proppants used in hydraulic fracturing and gravel-packing operations, 1$^{st}$ Ed, 2008, 30 p
5. ISO 13503-2:2006, 2006, (almost Identical of ANSI/API 19c) Petroleum and natural gas industries Completion fluids and materials Part 2, Measurement of properties of proppants used in hydraulic fracturing and gravel-packing operations. 28 p.
6. Luo, et al., 2012, Cement-based particulates and methods of use. U.S. Pat. No. 8,183,186, May 22, 2012.
7. Reyes, et al Ceramic coated particulates, U.S. Pat. No. 8,119,576, Feb. 21, 2012.
8. Nguyen, et al. Methods and compositions for consolidating particulate matter in a subterranean formation, U.S. Pat. No. 8,534,356, Sep. 17, 2013.
9. Bicerano, J., Method for the fracture stimulation of a subterranean formation having a wellbore by using impact-modified thermoset polymer nanocomposite particles as proppants. U.S. Pat. No. 8,492,316, Jul. 23, 2013

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of hydraulic fracturing of a subterranean formation having a well bore, comprising:
    injecting into said well bore a slurry containing a first proppant at sufficiently high rates and pressures to fracture said subterranean formation to accept said slurry, wherein said first proppant comprises coal combustion fly ash particles that have been hydraulically classified to have a mean particle size (d50) of between 45 µm and 150 µm and a size distribution defined by a (d98)≤250 µm and (d10)=5 µm, a sphericity of greater than 0.8, a roundness greater than 0.8, and further wherein the first proppant has a void volume of greater than 45% and a density in the range of 1.97 to 2.4 g/cm$^3$.

2. The method of claim 1, including injecting a second proppant into said well bore with said first proppant, said second proppant having a larger mean particle size than said first proppant.

3. The method of claim 1, including injecting a second proppant into said well bore after said first proppant, said second proppant having a larger mean particle size than said first proppant.

4. The method of claim 1, wherein the fly ash particles have a Stokes law settling velocity of 0.4 cm/sec or slower.

5. The method of claim 1, further comprising preparing the fly ash particles from a landfill or pond and selectively screened to remove both very coarse and very fine particles.

6. The method of claim 1, wherein the fly ash particles have a sphericity of greater than 0.9 and a roundness of greater than 0.9.

7. The method of claim 1, wherein the fly ash has a bulk density of 0.95 g/cm$^3$ or lower.

8. The method of claim 1, wherein the fly ash has a crush resistance, producing no more than 60% of less than 200 mesh (pan fraction), at a pressure of 13,000 psi (90 MPa).

9. The method of claim 1, wherein the fly ash has hydraulic conductivity of 7.8×10$^{-4}$ cm/sec or greater.

10. A method of hydraulic fracturing of a subterranean formation having a well bore, comprising:
   injecting into said well bore a slurry containing a first proppant at sufficiently high rates and pressures to fracture said subterranean formation to accept said slurry, wherein the first proppant comprises fly ash particles that have been classified to have a mean particle size (d50) of between 80 μm and 100 μm and a size distribution defined by a (d99.5)≤250 μm and (d10)=5 μm, a sphericity of greater than 0.8, and further wherein the first proppant has a void volume of greater than 40% and a density in the range of 1.97 to 2.4 g/cm$^3$.

11. The method of claim 10, including injecting a second proppant into said well bore with said first proppant, said second proppant having a larger mean particle size than said first proppant.

12. The method of claim 10, including injecting a second proppant into said well bore after said first proppant, said second proppant having a larger mean particle size than said first proppant.

13. A method of hydraulic fracturing of a subterranean formation having a well bore, comprising:
   injecting into said well bore a slurry containing proppant at sufficiently high rates and pressures to fracture said subterranean formation to accept said slurry, wherein said proppant consists of coal combustion fly ash particles that have been hydraulically classified to have a mean particle size (d50) of between 45 μm and 150 μm and a size distribution defined by a (d98)≤250 μm and (d10)=5 μm, a sphericity of greater than 0.8, a roundness greater than 0.8, and further wherein the proppant has a void volume of greater than 45% and a density in the range of 1.97 to 2.4 g/cm$^3$.

* * * * *